April 12, 1927.

J. J. O'CONNELL 1,624,503

TEMPLE ROLL

Filed May 18, 1926

Witness
Jas. J. Maloney.

Inventor
John J. O'Connell
by his attorneys

Patented Apr. 12, 1927.

1,624,503

UNITED STATES PATENT OFFICE.

JOHN J. O'CONNELL, OF MILFORD, MASSACHUSETTS, ASSIGNOR TO HOPEDALE MANUFACTURING COMPANY, OF MILFORD, MASSACHUSETTS, A CORPORATION OF MASSACHUSETTS.

TEMPLE ROLL.

Application filed May 18, 1926. Serial No. 109,873.

The present invention relates to an improvement in temple rolls.

The object of the invention is to produce a temple roll adapted for use with fine fabrics which will have a secure holding capacity, and at the same time will not injure fabrics. To this end the invention consists in the temple roll hereinafter described and claimed.

Figure 1:
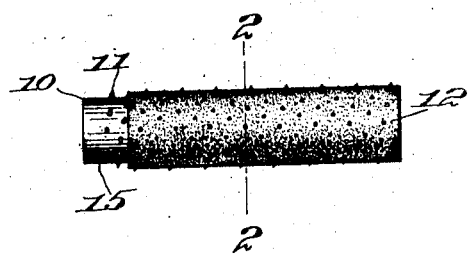
Figure 2:
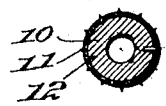
Figure 3:
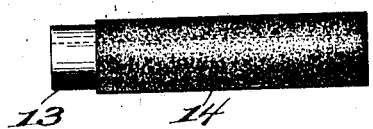

In the accompanying drawings illustrating the preferred form of the invention, Fig. 1 is an elevation of a temple roll embodying the invention; Fig. 2 is a section on the line 2—2, Fig. 1; Fig. 3 is an elevation of a modified form of the temple roll of the present invention; and Fig. 4 is an end elevation of the same.

The illustrated embodiments of the invention are described as follows: The temple roll consists of the usual wooden roll 10, provided with the usual teeth 11. The principal part of the surface of the temple roll is covered with a layer 12 of cork. This cork layer shortens the effective length of the teeth, and itself has sufficient frictional resistance to the motion of the cloth for it to operate effectively to stretch and distend the cloth being woven.

Figure 4:

In Figs. 3 and 4 the temple roll is shown as consisting of the usual wooden roll 13 provided with the cork layer 14. The modified form shown in Figs. 3 and 4 operates upon the cloth solely by reason of the friction which is created between the superficial layer of cork and the cloth, whereas in the preferred form there are employed in addition to the cork layer the usual temple roll teeth, but which teeth project beyond the surface of the cork only short distances. Besides, the outside end 15 of the roll is unprovided with a cork cover, and the teeth of the roll project from this surface the usual distance. This portion of the roll engages the cloth very close to the selvage, and the penetration of the teeth through the selvage portion of the cloth is not injurious to the fabric, as this portion is usually wasted in any event.

In its broader aspects the invention contemplates making a temple roll with a friction covering of cork, and in its narrower aspects the invention contemplates, in addition to the use of the cork, teeth which project only a short distance beyond the surface of the cork. More specifically yet the invention contemplates a temple roll having a cork friction surface and teeth on the outer end of the roll beyond the cork. The cork is preferably the finely comminuted cork dust which is compressed and heated in order to cause the particles to adhere to each other. Cement is sometimes used for causing the union of the cork particles, and with others the gum from the cork particles exuding under the influence of the heat to which the cork particles under pressure are subjected, itself unites the particles together.

The temple roll of this invention is particularly adapted for use in weaving silks and fine cloths in which large holes formed by the teeth of the temple roll, if of the usual length, would be conspicuous.

Having thus described the invention, what is claimed is:

1. A temple roll having a body covered with a layer of cork.

2. A temple roll having a body covered with a layer of cork having teeth projecting slightly beyond the surface of the cork.

3. A temple roll comprising a body and a cork outer layer extending from a point short of the outer end to the inner end of the roll.

4. A temple roll having a body, a cork layer covering the outer surface of the roll except at the outer end, said roll being provided with teeth at the outer end beyond the cork.

5. A temple roll having a body, a cork covering extending from a point short of the outer end to the inner end of the roll and having teeth projecting beyond the surface of the cork a slight distance and projecting a greater distance beyond the uncovered body surface.

In testimony whereof I have signed my name to this specification.

JOHN J. O'CONNELL.